April 12, 1955  G. R. TAYLOR  2,706,007
PROPELLER BLADE MOUNTING AND SERVO ACTUATOR
Filed Sept. 8, 1951
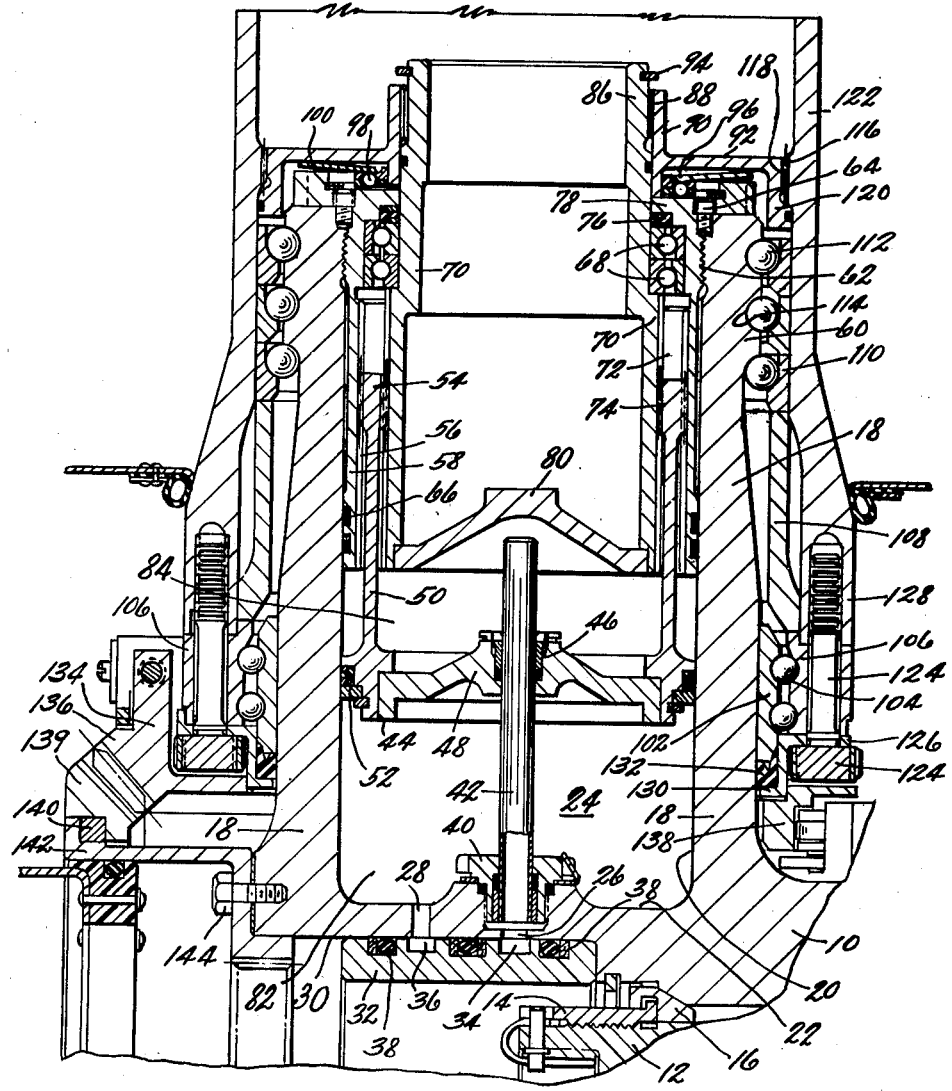
INVENTOR.
GARTHWOOD R. TAYLOR
BY
*Willits, Hardman & Fehr*
his ATTORNEYS

United States Patent Office 2,706,007
Patented Apr. 12, 1955

2,706,007

PROPELLER BLADE MOUNTING AND SERVO ACTUATOR

Garthwood R. Taylor, Dayton, Ohio, assignor to General Motors Corporation, Detroit, Mich., a corporation of Delaware Application September 8, 1951, Serial No. 245,679

14 Claims. (Cl. 170—160.33)

This invention relates to the design and construction of aircraft propellers with changeable pitch blades, and has for an object to design and manufacture such propellers accompanied by a reduction of weight without forfeiting mechanical strength.

Heretofore it has been the custom in the design of aircraft propellers in which the blade and socket housed the blade shifting motor, to mount the blade within a socket which socket and blade completely enclosed the fluid servomotor for changing the pitch of the blade in response to applied fluid pressure. It was customary to continue the opening of the blade socket into the shaft bore of the hub in order to make mechanical connection between the moving blade root of each socket and a master or coordinating gear. Such opening of the socket into the hub bore was difficult to obtain and so weakened the hub structure that a considerable mass of material must be left in order to provide sufficient mechanical strength to assure the hub against fracture. The present invention eliminates stress concentrations in the hub and accomplishes a rugged construction though accompanied by a reduction in the actual amount of material remaining in the hub.

The instant invention overcomes these objections by providing a hub with cup-like radially extending spindles within which is mounted the fluid pressure servo, and connecting the movable part of the servo at the outer end of the spindle with a blade root which is journalled for rotation about the outside of the spindle, and has a blade gear meshing with a master or coordinating gear outside of the hub. The cup-like spindle is not opened inwardly to the shaft or hub and has only fluid pressure openings of relatively small section for applying fluid pressure to either side of the fluid pressure motor, thus not weakening the hub structure.

Further objects and advantages of the present invention will be apparent from the following description, reference being had to the accompanying drawings wherein a preferred embodiment of the present invention is clearly shown.

In the drawing:

The single figure illustrates in longitudinal section the relation of a servomotor, hub spindle and blade retention constituting the improvement of this invention.

The improved structure may be incorporated in a propeller of the type shown in the Blanchard et al. Patents 2,307,101 and 2,307,102.

A hub member 10 is secured to drive shaft 12 by a nut 14 thrusting against a forward cone 16 which seats the hub 10 against the conventional rear cone shoulder. The hub 10 provides a number of cup-like or hollow spindles 18 extending radially from the axis of propeller rotation, and has a bore 20 extending from the outmost end to a bottom wall 22 to provide a servo cylinder 24. Through the bottom wall 22 of the spindle there are fluid pressure openings 26 and 28 that open into the hub bore 30. A grooved ring 32 is press fitted within the hub bore 30 and provides fluid pressure channels 34 and 36 that communicate with the openings 26 and 28. Fluid pressure seals 38 are provided where needed to prevent cross flow from one fluid passage to the other. An enlargement of the opening 26 threadedly receives a mounting plug 40 which supports a transfer tube 42.

A piston assembly 44 is mounted to reciprocate within the bore 20 and over the transfer tube 42 with which it has sealed engagement at 46 thru a head member 48. The head member 48 is rigidly secured to a cylindrical skirt portion 50 which has sealed engagement at 52 with the bore 20. The end of the skirt 50 has helical splines 54 on its outside that mate with helical splines 56 on the interior of a fixed spline member 58 that closely fits within the outermost end 60 of the hollow spindle 18 where it is threaded at 62 and locked against rotation by screw plug 64. The fixed spline member 58 has sealing engagement at 66 with the bore 20 of the hollow spindle and supports outer race members of anti-friction bearing 68, the inner race members being supported by a rotatable splined sleeve 70. Sleeve 70 provides helical splines 72 on its exterior that cooperate with helical splines 74 on the inside periphery of the piston skirt 50. The splines are generally of the type disclosed in the previously referred to Blanchard patents. A fluid pressure seal 76 disposed between the anti-friction bearing 68 and an inwardly directed flange 78 of the fixed spline member 58 provides assurance against leakage of fluid under pressure from the servomotor. A cylinder head 80 is secured to the inner end of the rotatable sleeve 70 and thus closes off the chamber 24 of the fluid pressure chamber, it being divided into two chambers 82 and 84 by means of the skirted piston 44.

The rotatable splined sleeve 70 has an extension 86 projecting beyond the flange 78 of the fixed splined sleeve; and beyond the end of the spindle 18 where it is provided with straight splines 88 that mate with similar splines on the interior of a flange 90 extending from an annular plate 92. The snap ring 94 prevents disengagement of the driving means between the movable part 86 and the plate 92. A thrust assembly 96 is disposed between the flange 78 of the fixed spline 58 and the annular plate 92, the thrust assembly comprising anti-friction balls 98 with race members and a spring disc 100 which is deflected upwardly to engage the underside of annular plate 92.

Mounted around the base portion of the hollow spindle 18 there is a race member 102 within the grooves of which are disposed ball bearings 104 of a radial bearing, which bearing includes a blade retaining plate 106 providing outer race members for the radial bearing. A spacing sleeve 108 engages the blade retaining plate 106 and supports the outer race members 110 of a stack of ball bearings 112 providing thrust bearing for the blade retention. The inner races of this thrust bearing is provided by integrally formed race members 114 on the exterior of the hub spindle 18. The root portion of the blade is hollow and provides a ring of straight internal splines 116 that interengage with splines 118 on the exterior of a flange 120 extending from the annular plate 92, thus completing the driving relation between the movable part 86 of the rotatable spline and the root 122 of the propeller blade.

In assembly of the blade the root portion 122 is passed over the annular plate 92, the outer race members of the thrust bearings 112, 114, 110 and the spacing sleeve 108. Screw devices 124 pass thru a seal flange 126, the blade retaining plate 106 and thread into the thickened end 128 at the terminating end of the blade root. The ring 126 has a flange 130 that retains a lubricant seal 132. A blade gear 134 is comprised of two parts 136 and 138 which are clamped together about the blade assembly to transfer its rotary motion to a master or coordinating gear 139 having a journal bearing 140 supported by a sleeve 142 secured to the foreward end of the hub spindle 18 by screw devices 144.

In operation when hydraulic medium under pressure is applied, by a valve mechanism disposed in a regulator of the type shown in the previously referred to Blanchard et al. patents, to one of the channels 34 or 36, and the other of the channels 34 or 36 is connected to drain, the piston 48 will move either upwardly or downwardly, as viewed in the drawing. As the piston 48 moves, the splined skirt 50 likewise moves, causing a twisting or rotation to occur between the skirt 50 and the fixed spline member 58 by reason of the engaging helical spline teeth 54 and 56. Movement of the piston 48 also tends to effect relative movement between spline teeth 74 of the skirt 50 and spline teeth 72 of the sleeve 70. In this manner sleeve 70 is caused to rotate with a movement which is the sum of that caused by the sum of the leads of helical spline teeth 54, 56, 72 and 74. This movement is transmitted by plate 92 to the propeller blade causing rotation thereof about its longitudinal axis whereby the pitch position of the blade will be altered.

While the embodiment of the present invention as herein disclosed, constitutes a preferred form, it is to be understood that other forms might be adopted.

What is claimed is as follows:

1. In an aircraft propeller having servo shiftable blades, the combination comprising, a hub having a hollow spindle constituting a fluid servo cylinder, a fluid servo unit secured within the cylinder and having a movable part extending outside of the cylinder, a blade having a root portion mounted for rotation on the hollow spindle, and means connecting the movable part of the servo unit with the blade root for shifting the blade when fluid pressure actuates the servo unit.

2. The combination set forth in claim 1 wherein, the servo unit comprises a pair of concentrically arranged helically splined members, a skirted piston having splined engagement with both of said splined members and adapted to reciprocate within said cylinder.

3. The combination set forth in claim 1 wherein, the fluid servo unit comprises a fixed splined member threaded into the end of the hub rotatable spindle, a rotatable splined member journalled within the fixed splined member and a skirted piston interengaging the fixed splined member and said rotatable splined member for effecting rotary movement of the rotatable splined member upon lineal movement of the piston.

4. In an aircraft propeller having servo shiftable blades, the combination comprising, a hub having a hollow spindle constituting a fluid servo cylinder, a fluid servo unit secured within the cylinder comprising a pair of relatively rotatable radially spaced sleeve portions, said spaced sleeve portions having helical splines coaxially spaced from one another, a piston having a skirt with helical splines engageable with the splined sleeve portions, and adapted to rotate one relative to the other upon lineal movement of said piston, means fixedly securing one of the sleeve portions to the end of the hub spindle, the other of said sleeve portions having a portion extending beyond the fixed sleeve portion, an annular plate drivingly secured to the extending portion, a blade having a root portion enclosing said spindle and having driven relation with said annular plate, means providing a thrust bearing between the blade root and the end of the hub spindle, means providing a radial bearing at the base of said hub spindle, and screw devices for securing the radial bearing to the blade root.

5. In an aircraft propeller having servo shiftable blades, the combination comprising, a hub having a hollow spindle extending radially therefrom, a propeller blade journalled for rotation on said spindle, a double acting fluid pressure servomotor mounted within the spindle, fluid pressure means for actuating said servomotor in either direction, and means transmitting the motion of said servomotor to rotary motion of said blade.

6. In an aircraft propeller having servo shiftable blades, the combination comprising, a hub having a hollow spindle providing a fluid servo cylinder, a flanged sleeve secured within the end of said hollow spindle and providing fixed helical splines, a rotatable sleeve journalled for rotation within the flanged sleeve and providing helical splines radially spaced from said first mentioned splines, a head member closing off the inner end of said rotatable sleeve, a piston lineally movable within the hollow spindle and having a skirt engageable with both of said splined sleeves, means for applying fluid under pressure to either side of said piston, a blade having a root portion journalled for rotation about said hollow spindle, and means transmitting movement of the rotatable sleeve to said blade root.

7. In an aircraft propeller having servo shiftable blades, the combination comprising, a hub having a hollow spindle constituting a fluid servo cylinder, a reversely operable fluid servomotor secured within the spindle, a blade having a root portion journalled for rotation on the spindle, means connecting a movable part of the servomotor with the blade root, and fluid pressure means for operating fluid servomotor whereby the blade may be rotated in either direction around said spindle.

8. In an aircraft propeller having servo shiftable blades, the combination comprising, a hub having a hollow spindle constituting a fluid servo cylinder, a fluid servo unit secured within the cylinder and having a movable part extending outside of the cylinder, said fluid servo unit comprising a fixed helically splined member secured to and extending within the hollow spindle, a rotatable splined member journalled for rotation within the fixed splined member and having helical splines concentric with and radially inward of the fixed splined member, and a piston within the cylinder having a skirt portion extending between said splined members and having splined engagement therewith, a blade having a root portion mounted for rotation on the hollow spindle, and means connecting the movable part of the servo unit with the blade root for shifting the blade when fluid pressure actuates the servo unit.

9. In an aircraft propeller having servo shiftable blades, the combination comprising, a hub having a hollow spindle constituting a fluid servo cylinder, a fluid servo unit secured within the cylinder and having a movable part extending outside of the cylinder, the movable part of the fluid servo unit having a straight splined portion, a blade having a root portion mounted for rotation on the hollow spindle, and means connecting the movable part of the servo unit with the blade root for shifting the blade when fluid pressure actuates the servo unit, said means comprising an annular plate having straight splined portions at its inner and outer diameter for engaging the straight splined portion of said movable part and a straight splined portion on the interior of the blade root.

10. In an aircraft propeller having servo shiftable blades, the combination comprising, a hub having a hollow spindle constituting a fluid servo cylinder, a fluid servo unit secured within the cylinder and having a movable part extending outside of the cylinder, the movable part of the fluid servo unit having a straight splined portion, a blade having a root portion mounted for rotation on the hollow spindle, means connecting the movable part of the servo unit with the blade root for shifting the blade when fluid pressure actuates the servo unit, said means comprising an annular plate having straight splined portions at its inner and outer diameter for engaging the straight splined portion of said movable part and a straight splined portion on the interior of the blade root, and a thrust assembly disposed between the fixed splined member and the annular plate.

11. In an aircraft propeller having servo shiftable blades, the combination comprising, a hub having a hollow spindle constituting a fluid servo cylinder, a fluid servo unit secured within the cylinder and having a movable part extending outside of the cylinder, a blade having a root portion mounted for rotation on the hollow spindle, and means connecting the movable part of the servo unit with the blade root for shifting the blade when fluid pressure actuates the servo unit, said means including an annular plate rotatably interconnecting the movable part and the interior of the blade root.

12. In an aircraft propeller having servo shiftable blades, the combination comprising, a hub having a hollow spindle constituting a fluid servo cylinder, a fluid servo unit secured within the cylinder and having a movable part extending outside of the cylinder, a blade having a root portion mounted for rotation outside of the hollow spindle, the mounting for the blade root including a thrust bearing assembly at the outermost portion of the hollow spindle, a radial bearing at the innermost portion of the hub spindle, and a spanning ring disposed between the thrust bearing and the radial bearing, and means connecting the movable part of the servo unit with the blade root for shifting the blade when fluid pressure actuates the servo unit.

13. In an aircraft propeller having servo shiftable blades, the combination comprising, a hub having a hollow spindle constituting a fluid servo cylinder, a fluid servo unit secured within the cylinder and having a movable part extending outside of the cylinder, a blade having a root portion mounted for rotation outside of the hollow spindle, the mounting for the blade root comprising a ball bearing thrust assembly at the outermost portion of the hub spindle including inner race members integral with the end of the hub spindle, a radial bearing assembly at the innermost portion of the hub spindle including an outer race member providing a blade retaining plate, and means rigidly securing the outer race member to the end of the blade root, and means connecting the movable part of the servo unit with the blade root for shifting the blade when fluid pressure actuates the servo unit.

14. In an aircraft propeller having servo shiftable blades, the combination comprising, a hub having a cup-like spindle for mounting a propeller blade, a blade with a hollow root surrounding the hub spindle, a thrust bearing mounting the blade root for rotation about the spindle, said spindle having at its outer end integrally formed races for the thrust bearing, a radial bearing mounted on the innermost portion of the spindle and including an outer race member, means spacing the radial bearing inwardly from the thrust bearing, a blade retaining plate including the outer race member for said radial bearing, screw devices securing the blade retaining plate to the end of the blade root, a blade gear secured to the blade retaining plate, and a reversely operable blade servo motor secured within the hub spindle and having a rotatable part drivingly connected with the blade root.

References Cited in the file of this patent

UNITED STATES PATENTS

| | | |
|---|---|---|
| 1,834,351 | Schroeder | Dec. 1, 1931 |
| 2,500,692 | Martin et al. | Mar. 14, 1950 |
| 2,509,104 | May | May 23, 1950 |
| 2,527,022 | May et al. | Oct. 24, 1950 |
| 2,528,281 | Martin et al. | Oct. 31, 1950 |